United States Patent
Garay et al.

(10) Patent No.: US 6,192,472 B1
(45) Date of Patent: Feb. 20, 2001

(54) METHOD AND APPARATUS FOR THE SECURE DISTRIBUTED STORAGE AND RETRIEVAL OF INFORMATION

(75) Inventors: Juan Alberto Garay, Yonkers; Rosario Gennaro, New York; Charanjit Singh Jutla, Elmsford; Tal D. Rabin, Riverdale, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/338,797

(22) Filed: Jun. 23, 1999

Related U.S. Application Data

(62) Division of application No. 08/928,982, filed on Sep. 12, 1997, now Pat. No. 5,991,414.

(51) Int. Cl.[7] .................................................. G06F 13/00

(52) U.S. Cl. .......................................... 713/165; 713/153

(58) Field of Search ................................... 713/165, 152, 713/168, 153, 180, 181, 193; 709/201; 380/25, 30, 282; 707/202

(56) References Cited

U.S. PATENT DOCUMENTS

| | | |
|---|---|---|
| 5,485,474 | 1/1996 | Rabin . |
| 5,491,749 * | 2/1996 | Rogaway et al. ....................... 380/25 |
| 5,491,750 * | 2/1996 | Bellare et al. ......................... 380/25 |
| 5,544,322 * | 8/1996 | Cheng et al. .......................... 380/25 |
| 5,604,490 * | 2/1997 | Blakely et al. ................. 340/825.31 |
| 5,625,692 * | 4/1997 | Herzberg et al. ....................... 380/21 |
| 5,752,041 * | 5/1998 | Fosdick ................................... 380/25 |
| 5,758,068 * | 5/1998 | Brandt et al. .......................... 380/25 |

OTHER PUBLICATIONS

David Chaum, "Blind Signatures for Untraceable Payments", Proceedings of Crypto 82, Aug. 1982, p. 199–203.

Ran Canetti et al., "Proactive Security: Long–Term Protection Against Break–Ins", RSA Laboratories' CryptoBytes, vol. 3, No. 1, Spring 1997, p. 1–16.

D. Chaum, "Achieving Electronic Privacy", Scientific American, Aug. 1992, p. 96–101. Copyright © 1992.

Hugo Krawczyk, "Secret Sharing Made Short", Advances in Cryptology—Crypto 1993, Lecture Notes in Computer Science, pp. 136–146, Springer–Verlag, 1993.

Krawczyk, H., "Distributed Fingerprints and Secure Information Dispersal", Proc. 20th Anual ACM Symp. On Principles of Disb/tributed Computing , pp. 207–218, Ithaca, NY, 1993.

Y.G. Desmedt. Threshold cryptography. European Transactions on Telecommunications, 5(4):449–457, Jul. 1994.

(List continued on next page.)

*Primary Examiner*—Robert W. Beausoliel, Jr.
*Assistant Examiner*—Pierre Eddy Elisca
(74) *Attorney, Agent, or Firm*—McGuireWoods; Louis B. Herzberg

(57) ABSTRACT

A solution to the general problem of Secure Storage and Retrieval of Information (SSRI) guarantees that also the process of storing the information is correct even when some processors fail. A user interacts with the storage system by depositing a file and receiving a proof that the deposit was correctly executed. The user interacts with a single distinguished processor called the gateway. The mechanism enables storage in the presence of both inactive and maliciously active faults, while maintaining (asymptotical) space optimailty. This mechanism is enhanced with the added requirement of confidentiality of information; i.e., that a collusion of processors should not be able to learn anything about the information. Also, in this case space optimality is preserved.

31 Claims, 9 Drawing Sheets

OTHER PUBLICATIONS

Rabin, M., "Efficient Dispersal of Information for Security, Load Balancing, and Fault Tolerance", Journal of the ACM, vol. 36(2), pp. 335–348–1989.

Bellare M. et al., "Keying Hash Functions for Message Authentication," Proc. Advances in Cryptology—CRYPTO 1996, LNCS vol. 1109, Springer–Verlag, pp. 1–15, 1996.

L. Lamport et al., The Byzantine General Problem, ACM Trans. Prog. Lang. and Systems, 4:3 (1982), pp. 382–401.

Shamir, A., "How to Share a Secret", Communications of the ACM, vol. 22, pp. 612–613, 1979.

* cited by examiner

METHOD AND APPARATUS FOR THE SECURE DISTRIBUTED STORAGE AND RETRIEVAL OF INFORMATION

This application is a division of U.S. patent application Ser. No. 08/928,982 filed Sep. 12, 1997, now U.S. Pat. No. 5,991,414.

BACKGROUND OF THE INVENTION

1. Field of the Invention

The present invention generally relates to the secure storage and retrieval of information and, more particularly, to a method and apparatus which guarantees the integrity and confidentiality of the stored information.

2. Description of the Prior Art

The problem this invention is concerned with is the secure storage and retrieval of information. Consider a user who stores his or her files on his or her workstation. Random failures (such as a hard disk crash) could cause the loss or the temporary unavailability of the data. Also possibly malicious intrusions may occur which would destroy both the confidentiality and integrity of the data. Ideally, the user would like a fully secure system which provides protection against these and maybe other kinds of faults without overburdening the system with memory and computational requirements.

Typically, protection against random failures is obtained via replication. That is, the data is stored in multiple locations so that failures in some of them can be tolerated. One such example is the Redundant And Inexpensive Drive (RAID) standard commonly used on servers in a Local Area Network (LAN). In order to obtain a significant degree of protection, there is a high cost in terms of memory requirements.

The notion of information dispersal was introduced by M. Rabin in his well-known Information Dispersal Algorithm (IDA) described in "Efficient Dispersal of Information for Security, Load Balancing, and Fault Tolerance", *Journal of the ACM*, Vol. 36(2), pp. 335–348, 1989. The basic approach taken in IDA is to distribute the information F being stored among n active processors in such a way that the retrieval of F is possible even in the presence of up to t failed (inactive) processors. The salient point was to achieve this goal while incurring a small overhead in needed memory. And in fact Rabin's result is space optimal. Retrieval of F is possible out of n–t pieces, where each piece is of length $$\frac{|F|}{n-t}.$$

The Information Dispersal Algorithm uses a linear transformation to convert m=nt–t bytes of input into m bytes of output. This transformation is given by an m×n matrix T over $GF(2^8)$. Moreover, the matrix T has the property that every (n-t) columns of T are linearly independent. Thus, each input and output byte is viewed as an element of $GF(2^8)$. The block size is m bytes and the operation is repeated for every m bytes.

Let the $(i,j)^{th}$ entry of T be represented by $T_{ij}$. Let $P_0$, $P_1, \ldots, P_{m-1}$ be a block of input. Then the output bytes $Q_0$, $Q_1, \ldots, Q_{n-1}$ are given by $$Q_i = T_{0,i} \cdot P_0 + T_{1,i} \cdot P_1 + \ldots T_{m-1,i} \cdot P_{m-1},$$

where the arithmetic is performed in the field $GF(2^8)$

Given any m output bytes, the input can be recovered because every m columns of T are linearly independent. In other words, the matrix S formed by taking the columns of T which correspond to these m output bytes is invertible. Again, the inverse of this matrix is computed over $GF(2^8)$.

As an example, let m=3 and n=5. The following matrix T has the property that every three columns of T are linearly independent. Note that we are using polynomials in x for representing elements of $GF(2^8)$. The polynomial arithmetic can be done modulo $x^8+x^6+x^5+x^4+1$, which is an irreducible polynomial over $GF(2)$.

$$T = \begin{bmatrix} 1 & 0 & 0 & 1 & 1+x \\ 0 & 1 & 0 & 1 & x \\ 0 & 0 & 1 & 1 & 1 \end{bmatrix}$$

If, for example, only the first, second and fifth byte of a coded text are known, the plaintext (or original text) can be retrieved by applying the following transformation to the three bytes of coded text:

$$\begin{bmatrix} 1 & 0 & 1+x \\ 0 & 1 & x \\ 0 & 0 & 1 \end{bmatrix}$$

In addition to its optimal space complexity, the IDA technique has the following very attractive properties:

- it permits any party in the system to retrieve the distributed information (by communicating with the piece holders);
- it does not require a central authority;
- it is symmetric with respect to all participants; and
- no secret cryptographic keys are involved.

However, this combination of very desirable properties is achieved at the expense of limiting the kind of faults against which the algorithm is robust, namely, by assuming that available pieces are always unmodified.

An enhanced mechanism to reconstruct the information when more general faults occur was presented by H. Krawczyk, in "Distributed Fingerprints and Secure Information Dispersal", *Proc. 20th Annual ACM Symp. on Principles of Distributed Computing*, pp. 207–218, Ithaca, N.Y., 1993, who called this problem, and its solution, the Secure Information Dispersal problem/algorithm (SIDA). This mechanism is able to tolerate malicious parties that can intentionally modify their shares of the information, and is also space optimal (asymptotically). In a nutshell, SIDA makes use of a cryptographic tool called distributed fingerprints, which basically consists of each processor's share being hashed, i.e., the fingeprints, and then distributing this value among an processors using the coding function of an error correcting code that is able to reconstruct from altered pieces (e.g., the Reed-Solomon code). In this way, the correct processors are able to reconstruct the fingerprints using the code's decoding function, check whether pieces of the tile were correctly returned, and finally reconstruct F from the correct pieces using the IDA algorithm.

A shortcoming of these methods is to assume that the faults only occur at reconstruction time, after the dispersal of the shares has been properly done.

SUMMARY OF THE INVENTION

It is therefore an object of the present invention to provide a solution to the general problem of Secure Storage and Retrieval of Information (SSRI) and guarantee that also the process of storing the information is correct even when some of the processors fail.

We consider the scenario in which a user interacts with the storage system by depositing a file and receiving a proof (in the form of a receipt) that the deposit was correctly executed. For efficiency reasons, we require the distributed nature of the system to be transparent to the user, who will interact with a single distinguished processor which we call the gateway. This distinguished processor does not need to be the same for all users. This adds the extra technical difficulty of designing the protocol in a way that the gateway is not a single point of failure. The invention provides the following:

SSRI with integrity: We introduce a mechanism that extends the above methods to enable storage in the presence of both inactive and maliciously active faults, while maintaining the (asymptotical) space optimality of the above methods. Namely, each share is of size $$\frac{|F|}{n-t}$$

plus a small quantity q which does not depend on the size of the file (but on n and a security parameter s defined as the logarithm base two of an acceptable probability of failure of the system).

SSRI with integrity and confidentiality: We also introduce a mechanism for SSRI with the added requirement of confidentiality of information;

i.e., that any collusion of up to t processors (except ones including the rightful owner of the information) should not be able to learn anything about the information. Also, in this case space optimality is preserved.

First we concern ourselves only with the integrity of the information. We introduce simple protocols that extend the above methods to enable storage in the presence of malicious faults, while maintaining the (asymptotical) space optimality of the above methods. Namely, each share is of size $$\frac{|F|}{n-t}$$

plus a small quantity q which does not depend on the size of the file (but on n and a security parameter s). Our storage protocol is designed so that some form of consistency is maintained among the processors without incurring the cost of (potentially expensive) agreement protocols. Another important technical element of the storage protocol is the generation of receipts for the deposit of files through the application of distributed digital signatures. It will guarantee that a receipt is issued only when the correct information has been stored.

We also consider SSRI with the added requirement of confidentiality of information; i.e., that any collusion of up to t processors (except ones including the rightful owner of the information) should not be able to learn anything about the information. Confidentiality of information is easily achieved by encryption. Yet, this in return poses two problems. One is key management; that is, the safe deposit of the cryptographic key(s) used to encrypt the file that is deposited. And the second problem is how under this scheme would the user retrieve his file? Remember that he or she is communicating with the system through a single gateway, which means that if we use only known techniques of secret sharing reconstruction as described, for example, by A. Shamir in "How to Share a Secret", *Communications of the ACM*, Vol. 22, pp. 612, 613, 1979, the gateway will know all the information available to the user.

One novel component of our confidentiality protocol is the distributed key management aspect, via the application of threshold cryptography. This is a mechanism that allows the user to keep his or her decryption key shared among several (say n) servers in such a way that when the user wants to decrypt a given ciphertext, he or she will have to interact with a single server (the gateway) to obtain the matching plaintext, while none of the servers (including the gateway) gets any information about the plaintext. This solves the first problem.

The way we get around the second problem is via a novel application of "blinding" in the context of decryptions rather than signatures. See D. Chaum, "Blind signatures for untraceable payments", *Proc. CRYPTO* 82, pp. 199–203, 1983.

The novel characteristics of our invention are:
distributed implementation of the storing device,
tolerance of faults (inactive or maliciously active) during the process of storing and retrieval of the information,
tolerance of faults as above, where all servers can be faulty during the lifetime of the system but only up to t servers can be faulty during each time interval (herein referred to as proactive SSRI),
transparency of the distributed implementation from the user's point of view, and
space optimality.

Potential uses and applications of our invention are:
Electronic Vault. A robust distributed repository (a.k.a. E-Vault, strong box, safety box, secure back-up, secure archive) of users' information.
A mechanism for the delivery and distribution of files in a communication network robust against malicious failures and break-ins.
Regular and anonymous electronic P.O. Boxes with the same robustness and resiliency properties.
Secure distributed file system. We view the SSRI as implemented at the application Layer. However, the concepts described above can be broadened to apply to a distributed file system, with a richer functionality and security properties over Sun's Network File System (NFS) and the DCE-based Distributed File System (DFS).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Model, Definitions, and System Considerations

Figure 1:
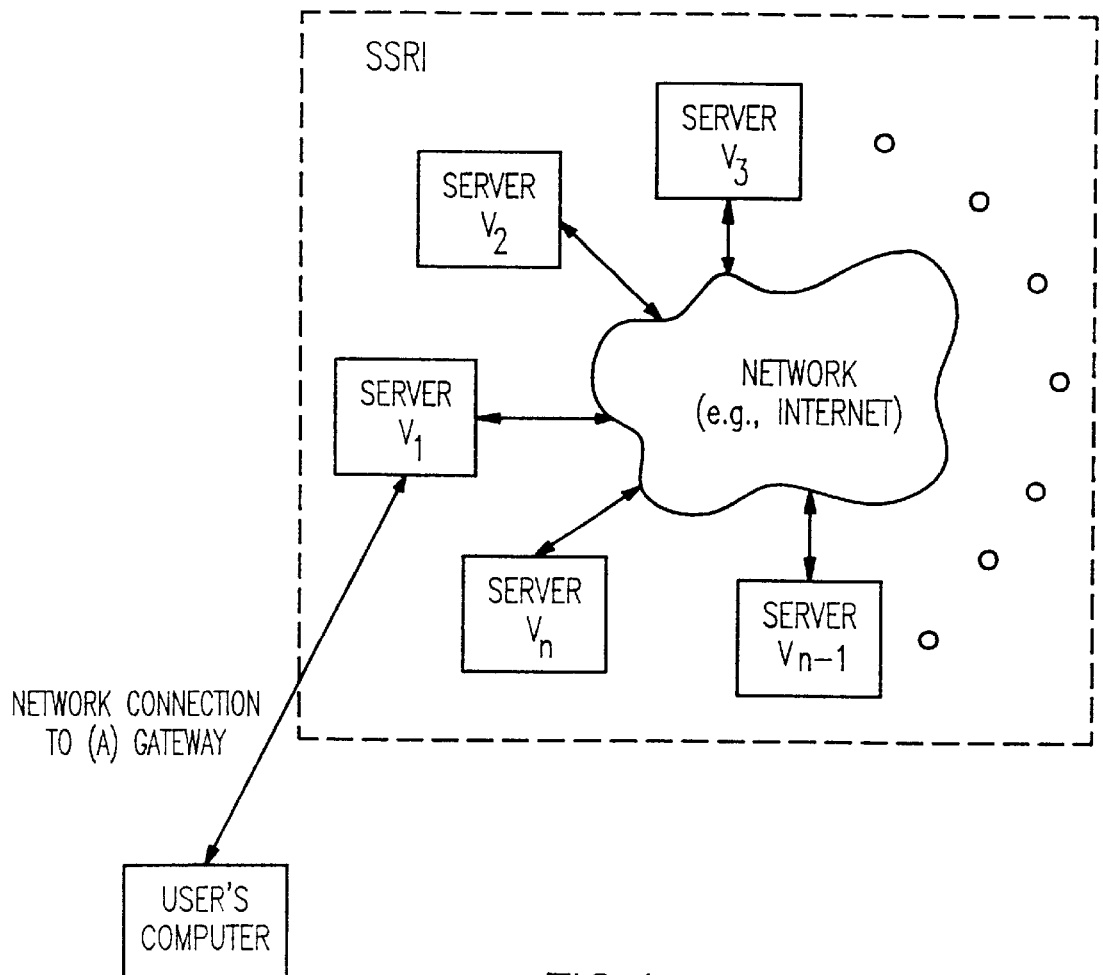
FIG. 1 is a generalized block diagram showing a computer network system on which the method according to the invention may be implemented.

Referring now to the drawings, and more particularly to FIG. 1, we start by describing an abstraction of the distributed system in which our invention is practiced. The distributed system includes a communication network with two classes of entities: the users, denoted $U_1, U_2, \ldots, U_m$, and the servers, denoted $V_1, V_2, \ldots, V_n$. In FIG. 1, only one user is indicated, but it will be understood that in a practical system, there will be a plurality of users. We will sometimes refer to the servers collectively as V. It is among the servers that the distributed storage of the information takes place.

We model the communication among the servers by a completely connected graph of authenticated links. For the purpose of this description, we also assume a point-to-point communication link between each of the users and every server. The servers V are connected in a network, which may be an intranet (e.g., LAN, WAN, etc.) or the Internet. In its preferred form, it is contemplated that the invention will be implemented on the World Wide Web (WWW). In such an environment, authenticated communication can be realized through, for example, SSL. Similarly, point-to-point communication can be realized in various ways, and not necessarily through a direct connection.

In a specific implementation of the invention, the servers may be IBM RS/6000 servers running the AIX operating system (IBM's version of the UNIX operating system), but these servers may also be mini-computers, such as IBM's AS/4000 computers, or mainframe computers, such as IBM's ES/9000 enterprise series computers. Other comparable computers of various other manufactures may be used as well. Secure point-to-point connections between servers may be provided by the Internet secure protocol IPSec.

For efficiency's sake, in our protocols the users will interact with a single, not necessarily the same, distinguished server, called the gateway (GW) server. However, our design is uniform in the sense that all servers are able to perform the same distribution and recovery functions. Thus, as shown in FIG. 1, the user's computer, which may be a personal computer (PC) with WWW interface, is connected to server $V_1$ via a secure Internet connection (SSL); however, the user's computer may be connected to any one of the servers which, for purposes of either file storage or retrieval, may be designated as the GW server.

We assume the availability of a global clock, which allows the network computation to evolve as a series of rounds. Again, this is for simplicity of exposition, as our only need is a reliable time out mechanism and means to guarantee the freshness of authentication. Possible realizations of the latter are via secure time stamps.

It is assumed that at any time during the life of the system, at most t of the n servers can malfunction. Our design tolerates a wide range of failures, specifically:

Inactive failures (aka crash failures, fail-stop failures, omission failures): These failures occur when servers stop prematurely or when servers fail to send and receive messages as prescribed by the protocols.

Malicious failures (aka arbitrary failures, Byzantine failures): These failures occur when servers can act arbitrarily, without any restriction to their possible behavior. Further, we assume that the faulty servers can collude and act in concert in order to disrupt the computation. For example, the bad servers may try to prevent the storage or reconstruction of a file, learn some information, say a key, which a user wants to keep private.

The last type of fault reflects the security concern of break ins. We also assume that n>2t.

Reconstruction is possible in information dispersal methods because some redundancy is added to the n pieces into which the original information is partitioned. The amount of redundancy in an information dispersal method is typically measured by the following parameter.

Definition 1. The blow-up factor of an information dispersal scheme is the ratio between the total size of the information being dispersed and the size of the original information. (By total size, we mean the sum of sizes of all distributed pieces.)

The blow-up of the methods of Rabin and Krawczyk, supra, is $$\frac{n}{n-t},$$

which is clearly optimal if only n−t pieces are to be used for reconstruction. Our methods also maintain this bound. We note that reconstruction of information is also possible through error correcting codes. However, the inherent blow-up factor deteriorates to $$\frac{n}{n-2t}$$

in this case.

We now turn to describe the various cryptographic mechanisms that our protocols use.

Cryptographic Terminology and Tools

The cryptographic primitives used in the protocols are summarized in Tables 1 and 2.

TABLE 1

| Keys | |
| --- | --- |
| $PK_U, SK_U$ | Public and secret keys for a 1024-bit RSA-OAE of user/party U |
| $CERT_U$ | Public key certificate of user U issued by the servers V. We assume it includes U, $PK_U$ and V's signature on $PK_U$. |
| $PK_{U,s}, SK_{U,s}$ | Public and secret "signing" keys of user/party U for a 1024-bit RSA-SHA-1 scheme |
| $skv_i$ | Server $V_i$'s share of secret key $SK_v$ |

TABLE 2

| Cryptographic Primitives | |
| --- | --- |
| $\mathcal{H}(\cdot)$ | SHA-1: a strong collision-resistant one-way hash function. Think of $\mathcal{H}(\cdot)$ as returning "random" values |
| $E_U$ | 1024-bit RSA-OAE public key encryption using $PK_U$ |
| $S_U(\cdot)$ | RSA-SHA-1 digital signature with respect to $SK_U$. Note the signature of message m does NOT include m. |

TABLE 2-continued

Cryptographic Primitives

| | |
|---|---|
| $Sv_{1, \ldots, v_n}(\cdot)$ | Distributed RSA-SHA-1 digital signature with respect to keys $skv_1, \ldots, skv_s$ |
| $\sigma v_i(\cdot)$ | Partial digital signature with respect to $skv_i$ |
| $e_K$ | DES-CBC: symmetric key-based encryption algorithm, taking key K and a plaintext, and producing the ciphertext |
| $mac_K$ | HMAC: message authentication code (MAC), taking key K and a plaintext, and returning a short tag |
| $f_K$ | HMAC: a conjectured pseudorandom function with index K |
| $RS(\cdot)$ | Reed-Solomon code |

All the users have public/secret key pairs. These keys are used for the basic encryption/decryption functions, respectively. (For simplicity, we will assume that the servers also act as the certification authority (CA), so that no third party needs to be involved in the transactions in order to verify the validity of the public keys.) The encryption function is randomized: E, invoked upon message m will use some randomizer, so that each encryption is different from previous ones. The notation $\oplus$ denotes bitwise exclusive OR (XOR).

The privacy requirement of SSRI with confidentiality raises the question of key management; i.e., the safe deposit of the keys used to encrypt the files. The simplest solution requires each user to have a public key for encryption, say $PK_U$, and the corresponding private key $SK_U$. This requires the user U to maintain $SK_U$ in a safe manner. For conceptual and security reasons, we assume users have two sets of public/secret key pairs, one for encryption and the other for authentication ($SK_{U,s}$) (i.e., "signing") purposes. (This is a natural assumption, as all browsers provided it in some form or another.) Ideally, the user would keep the latter in her smart cards; alternatively, the user's application (e.g., a browser) would (only) provide an authentication key.

The following describes two major tools that we use in our protocols.

Threshold Cryptography

The security of cryptographic protocols relies mainly on the security of the secret keys used in these protocols. Security means that these keys should be kept secret from unauthorized parties, but at the same time should always be available to the legitimate users.

Threshold cryptography embodies techniques that help in achieving the above goals. Suppose you have a key K which is used to perform some cryptographic function F on a message m, denote the result with $F_K(m)$. The idea is to start with a sharing of K among a set of players $P_1, \ldots, P_n$ using a (t,n) secret sharing scheme. See Shamir, supra. And then compute PH without ever reconstruct the key K, using it instead implicitly when the function $F_K$ needs to be computed. This is done by having the players compute values based on their shares of the key.

There are various methods for generating the sharing of the secret key. Here we will only note that they require various levels of trust in the system.

In the following we will use this terminology. Let the n servers $V_1, \ldots, V_n$ hold shares $sk_1, \ldots, sk_n$, respectively, of a secret key SK which is the inverse of a public key PK.

A distributed threshold decryption protocol using $V_1, \ldots, V_n$, is a protocol that takes as input a ciphertext C which has been encrypted with PK (i.e., $c=E_{PK}(m)$ for some message m), and outputs m.

A distributed threshold signature protocol for $V_1, \ldots, V_n$ is a protocol that takes as input a message m and outputs a signature a for m under SK.

The above protocols must be secure; i.e., they must reveal no information about the secret key SK. A threshold cryptography protocol is called t-robust if it also tolerates t malicious faults.

Using threshold cryptography increases the secrecy of the key since now an attacker has to break into t+1 servers in order to find out the value of K. Also, the basic approach increases the availability of the key in the presence of fail-stop faults (crashes). Indeed, it suffices to have t+1 functioning servers to be able to compute the function $F_K$, meaning that one can tolerate up to n−t−1 crashes.

A survey of threshold cryptography technique can be found in Y. G. Desmedt, "Threshold Cryptography", *European Transactions on Telecommunications*, 5(4):449–457, Jul. 1994. We present below an example of threshold cryptography applied to the RSA cryptosystem.

Example: Threshold RSA

We give a specific example of threshold cryptography assuming that the public key cryptosystem used is RSA. In this case, $$PK=(3,N),$$

where N is the RSA module, and $$SK=(d,N),$$

where d is the inverse of 3 modulo $\phi$ (N). Assume that the user's secret key SK has been shared as an n-out-of-n sharing, meaning all the shares will be required in order to reconstruct the key (this is without loss generality, as it is easy to generalize to a threshold scheme). We can assume that $SK_j=d_j$,
where $$d_1+ \ldots +d_n=d \bmod \phi(N).$$

Assume we want to compute a signature $\sigma=m^d$ mod n for a message m. Then each server can compute the following $$\sigma_j=m^{d_j} \bmod N$$

and then we see that $$\sigma_1 \cdot \sigma_2 \ldots \sigma_n = m^{d_1} \ldots m^{d_n} = m^{d_1+ \ldots +d_n} = \sigma$$

A dual approach clearly works for RSA signatures.

Initialization

The n servers are initialized in a trusted environment. Each of them is given a "name" (i.e., $V_1$ to $V_2$), an Initialization Procedure (IP) address and a share of the signing and decryption key for the whole system. The key generation is done by a trusted party who then "self-destroys" after generating such keys and sharing them among the servers. In case one uses discrete-log based cryptosystems, it is possible to have the n servers run a key generation protocol which eliminates the need for such trusted party. However, the other parts of the initialization needs to be conducted in a trusted environment.

Blinding

The cryptographic technique called "blinding" as described by Chaum, surpa, can be explained as follows. Suppose that a server holds a secret key SK that allows the server to compute a cryptographic function $F_{SK}$ (once again, think of F as a signature or a decryption algorithm). Assume also that the matching public key PK is known, which allows the computation of the inverse function $F_{PK}=F_{SK}^{-1}$.

Consider the following problem. A user wants to obtain the result of $F_{SK}(m)$ but without telling the server the value in on which he wants the function to be computed. If the functions $F_{PK}$ and $F_{SK}$ are homomorphic, i.e., F(ab)=F(a)F(b), then the problem has a solution.

The user generates a random string r, computes the value $s=F_{PK}(r)$ using the public key PK and presents the server with the value ms which is random and thus gives no information about m. The server returns the value $F_{SK}(ms)$ which, by the homomorphic properties of $F_{SK}$, is equal to $F_{SK}(m)F_{SK}(s)=F_{SK}(m)F_{SK}(F_{PK}(r))=F_{SK}(m)\cdot r$. Thus, if the user divides the obtained result by r, he or she obtains the desired output.

Example: Blinding with the RSA Cryptosystem

We present an example of the blinding technique as described Chaum based on RSA. The server owns the secret key SK=(d,N) and the user knows the public key PK=(e,N). The user wants to decrypt a ciphertext $c=m^e$ mod N without telling the server c. The user chooses r at random and computes s=re mod N. The user then gives cs=(mr) mod N to the server who returns $w=(CS)^d=mr$ mod N. Finally, the user computes $$m = \frac{w}{r} \bmod N.$$

A novelty of this invention is the way we use blinding. Traditionally, this technique was introduced to obtain signatures from a server on secret messages. This is in turn was used to produce untraceable electronic cash. We use blinding in the context of decryptions rather than signatures in order to enhance the security of our distributed key management. The use of blinding will protect the privacy of the user's information against all servers (in particular the "gateway" or GW server), hence eliminating the possibility of privacy loss due to a single point of failure.

We now present a high-level description of our "integrity only" protocol. The protocols extend the methods of Rabin and Krawczyk, supra, for integrity to achieve SSRI while maintaining (asymptotically) the space optimality. Namely, each share of the file F deposited at each server is of size $$\frac{|F|}{n-t}$$

plus a small quantity which does not depend on the size of the file. We distinguish the following three transactions in SSRI for integrity:

Deposit: User U contacts the gateway GW, deposits file F, and gets a receipt for it.

Dispersal: The actual information dispersal takes place among the servers $V_j$.

Retrieval: The user contacts GW to get F back.

The Deposit protocol is initiated by a user U who would like to store a file safely. The user contacts one of the servers (GW) and transmits a request for deposit. This request includes a digital signature on the file being stored. The user will conclude that the deposit has been carried out successfully once he or she receives a receipt from GW. We require that the protocol for Deposit satisfy the following two conditions:

Deposit Availability: A user wishing to deposit a file will always manage to do so and will receive a receipt (i.e., proof of deposit).

Deposit Correctness: If a receipt is generated by the servers for a file F, then all the correct servers have a copy of the file.

Figure 2:
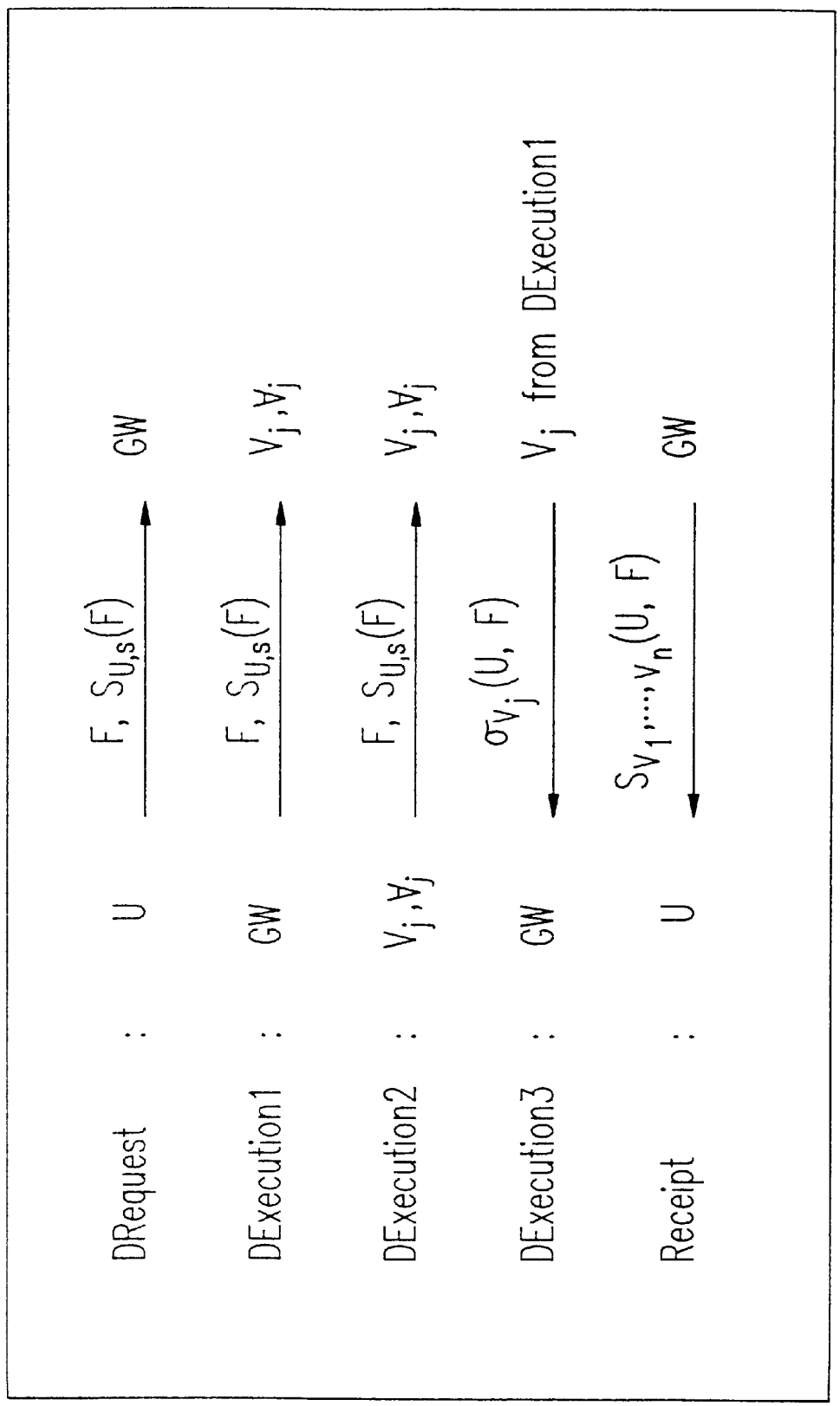
FIG. 2 is a protocol flow diagram illustrating the deposit protocol according to the invention.

Table 3 is a skeleton of the (fault-free) flow of the protocol for Deposit, and FIG. 2 is the corresponding protocol flow diagram.

TABLE 3

| | Fields |
|---|---|
| F | User' file to be deposited at the servers. |

For the purpose of this description, we set aside all kinds of optimization issues, such as reducing the number of "echo" messages, reducing their size (e.g., only re-transmit the file when necessary, otherwise send its hash), arranging fields so that cryptographic operations do not have to be computed twice, etc. For the issuance of the receipt, the servers implement a (t+1)-threshold signature, meaning that at least t+1 servers have to participate in the signing, and that the faulty servers by themselves cannot generate a correct signature.

Figure 3:
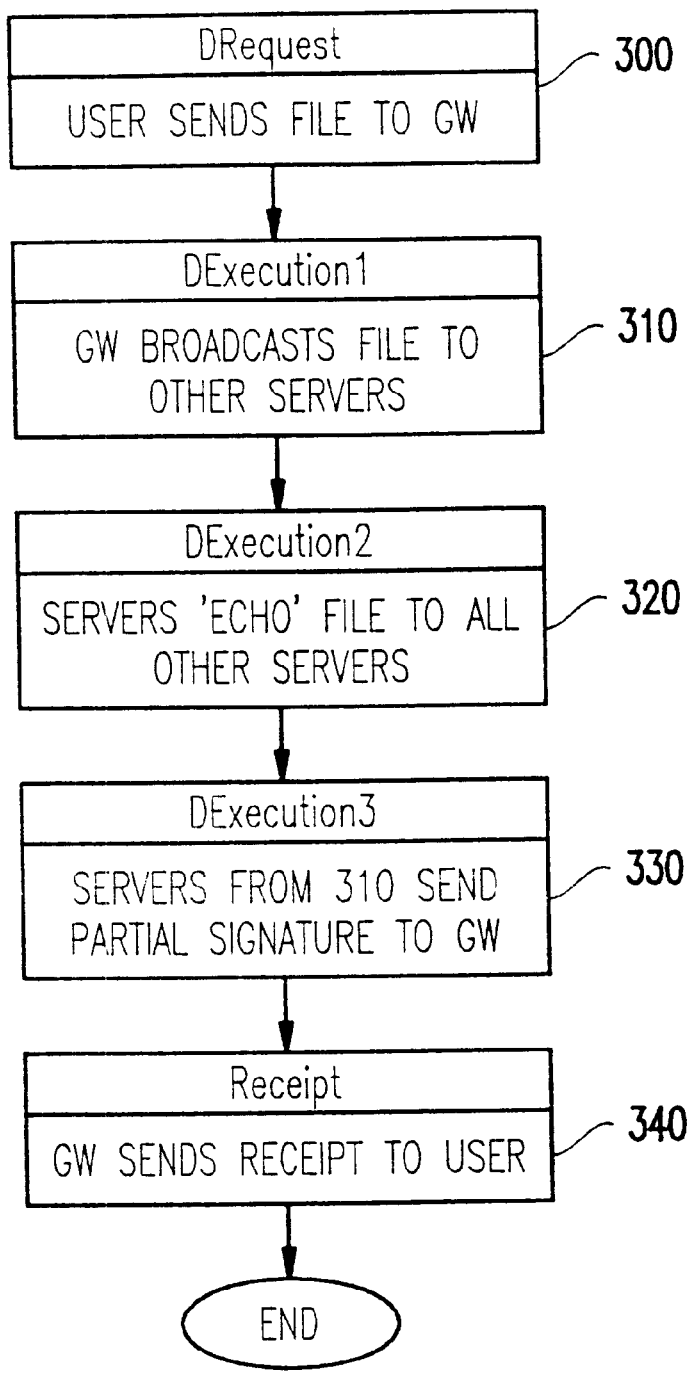
FIG. 3 is a flow diagram of the deposit protocol performed by the servers in FIG. 1.

We now describe the protocol in more detail, with reference to FIG. 3. In deposit request 300, the user contacts GW and submits the file he or she wants to deposit, together with his or her signature on the file under his or her private authentication key. The user keeps a hash of the file $\mathcal{H}(F)$ for future control. This is not mandatory, but it will enable the user to verify the file upon retrieval without verifying a digital signature. In execution block 310, the GW forwards the request from the previous flow to the remaining servers. Every server receiving a (valid) message from GW "echoes" this message request to every other server at 320. Servers receiving at least one valid message store F as a valid request from user U. Servers receiving the DExecutionl (block 310) message from GW use their share of the secret key to generate a partial signature on F and U, and send this message to GW at block 330. Servers not receiving a DExecutionl message from GW do not participate. In receipt 340, the GW computes the distributed digital signature on F and U, and sends it to the user. Should the user not receive a receipt from GW, he or she tries again a different server (as the design of the servers is uniform, it is guaranteed that the user will eventually contact a correct server).

We note that a solution is possible which does not require the user to generate a signature during Deposit. This, however, happens at the expense of the servers running a Byzantine agreement protocol in order to maintain consistency. Roughly, in Byzantine agreement, as described, for example, by L. Lamport, R. E. Shostak and M. Pease, "The Byzantine General's Problem", *ACM Trans. Prog. Lang. and Systems*, 4:3(1982, pp. 382–401, a distinguished processor called "the source" sends its initial value to all other processors. It is required that upon termination of the protocol all the correct processors output the same "value and, moreover, if the source is correct, then the value the correct processors output is the value sent by the source. However, running a Byzantine agreement protocol is potentially expensive, in terms of number of communication rounds (greater than or equal to t+1), and communication complexity.

We now provide some justification for the correctness of the Deposit protocol.

Lemma I Protocol Deposit satisfies the Deposit Availability and Correctness conditions.

Proof: Deposit Availability. If GW does not respond to the user with a receipt, then the user will turn to another server in order to deposit the file. As, by assumption, only a fraction of the servers can malfunction and the design of the servers is uniform, it is guaranteed that the user will eventually contact a correct GW. Once this happens, all the correct servers get the user's message, reply with a partial signature under their share of the private key, and a correct receipt is generated by GW and sent to the user.

Deposit Validity. If a receipt is generated for a file F, then there were at least t+1 partial signatures generated for this file under the server's shares of the secret key $SK_v$. As we assume that at most t of the servers can be faulty, this implies that at least one of these partial signatures was generated by a correct server. A correct server generates a partial signature only if it has received a valid deposit request from GW, and in this case it also echoes the file to all the other servers. Hence, every correct server has a copy of the file.

Dispersal

The sketch for the second transaction, Dispersal, is shown in Table 4.

TABLE 4

| | Fields |
|---|---|
| F | User file to be dispersed among servers $V_i$, $1 \leq i \leq n$ |
| $F_i$ | Portion of the file dispersed at server $V_i$ |
| $\mathcal{H}(F_i)$ | Hash of $F_i$ |

The protocol steps are as follows:
Each server Vi, $1 \leq i \leq n$, does:
$\forall_j$, $1 \leq j \leq n$, compute $F_j = F \cdot T_j(IDA)$;
$\forall_j$, $1 \leq j \leq n$, compute $\mathcal{H}(F_j)$;
save $F_i$ and $\mathcal{H}(F_j)$, $1 \leq j \leq n$.

We assume that the starting point for Dispersal is consistent as a result of Deposit. Namely, every correct server has a copy of the user's file F. The dispersal is a local computation requiring no communication. Every correct server computes everybody's share of F using IDA and the corresponding hashes of the pieces, and saves its own share of the file and all the hashes.

The storage required by this method is as follows. Each server is saving its portion of the file $|F_i|$, plus all the hashes $\mathcal{H}(F_j)$, $1 \leq j \leq n$. Thus, the memory required at each server is $|F_i|+n|\mathcal{H}(F_j)|$. We note that $|\mathcal{H}(F_j)|$ is independent of the size of F and small (e.g., 160 bits). This overhead becomes relatively Less significant as the size of the file increases. In contrast, Krawczyk, supra, suggests sharing the hashes of the pieces themselves using Reed-Solomon codes. The space required by that method is $$|F_i| + \frac{n}{n-2t}|\mathcal{H}(F_j)|.$$

Thus, our approach is slightly less efficient storage wise but with the advantage of avoiding the complexity of the coding and the communication. (Also note that for values of realistic implementations, e.g., n=5 and t=2, the storage requirements would be identical.)

Retrieval

Retrieval is the transaction initiated byh a user in order to retrieve a file he or she has previously deposited and for which he or she has received a receipt. The protocol for Retrieval satisfies the following requirements:

Retrieval Availability: A user who has previously deposited a file (and received a receipt for it) will always be able to retrieve Retrieval Correctness: It is impossible for a part other than the rightful owner of the file to retrieve it.

Figure 4:
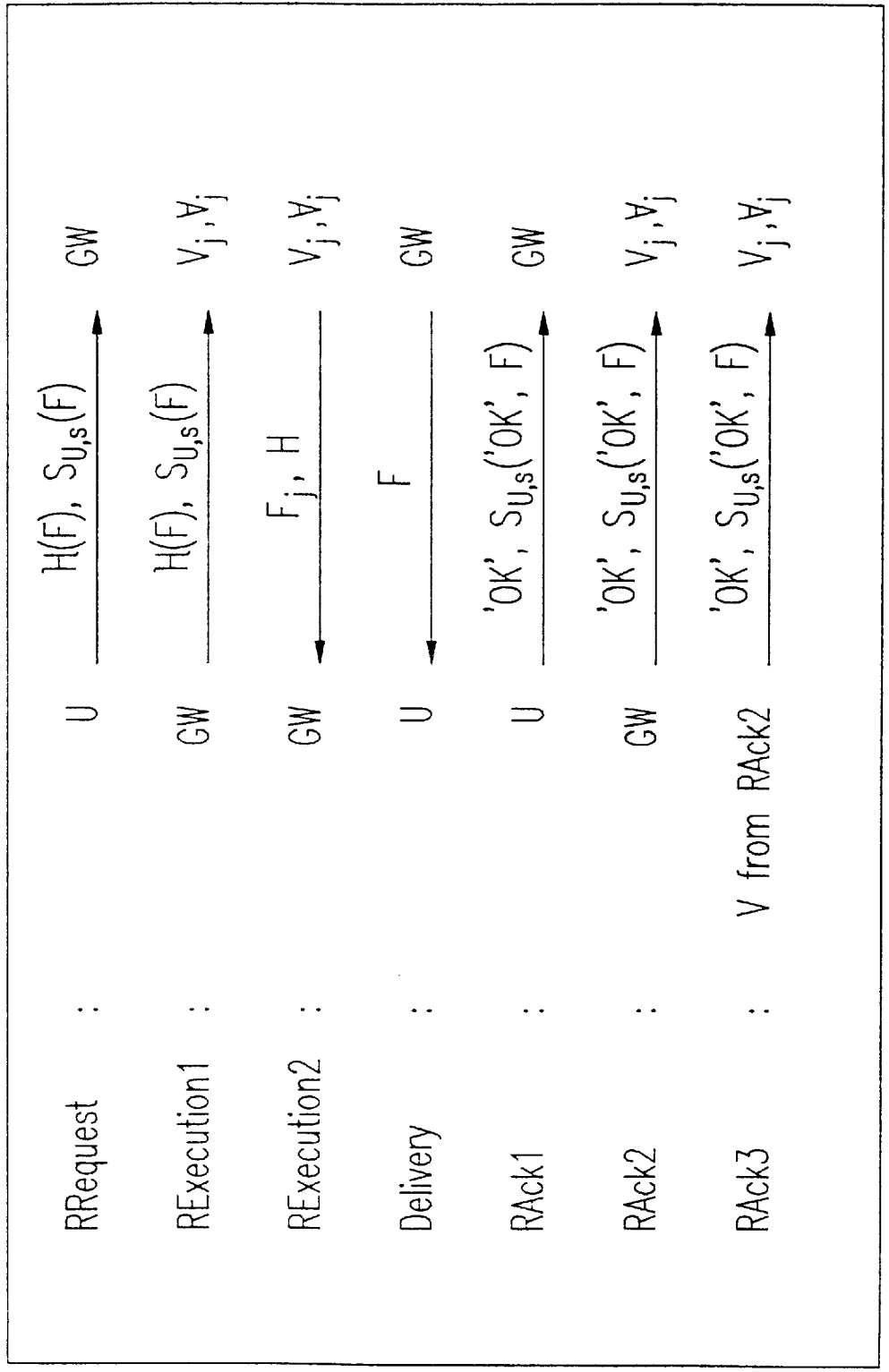
FIG. 4 is a protocol flow diagram illustrating the retrieval protocol according to the invention.

The protocol flows for the Retrieval transaction is shown in Table 5, and its protocol flow diagram is shown in FIG. 4.

TABLE 5

| | Fields |
|---|---|
| $F_j$ | Portion of the file stored in server $V_j$ |
| $\mathcal{H}(F_j)$ | Hash of $F_j$ |
| $\mathcal{H}$ | Hashes of all fis stored at each server, i.e., $\mathcal{H}(F_i)$, $1 \leq i \leq n$ |

Figure 5A:
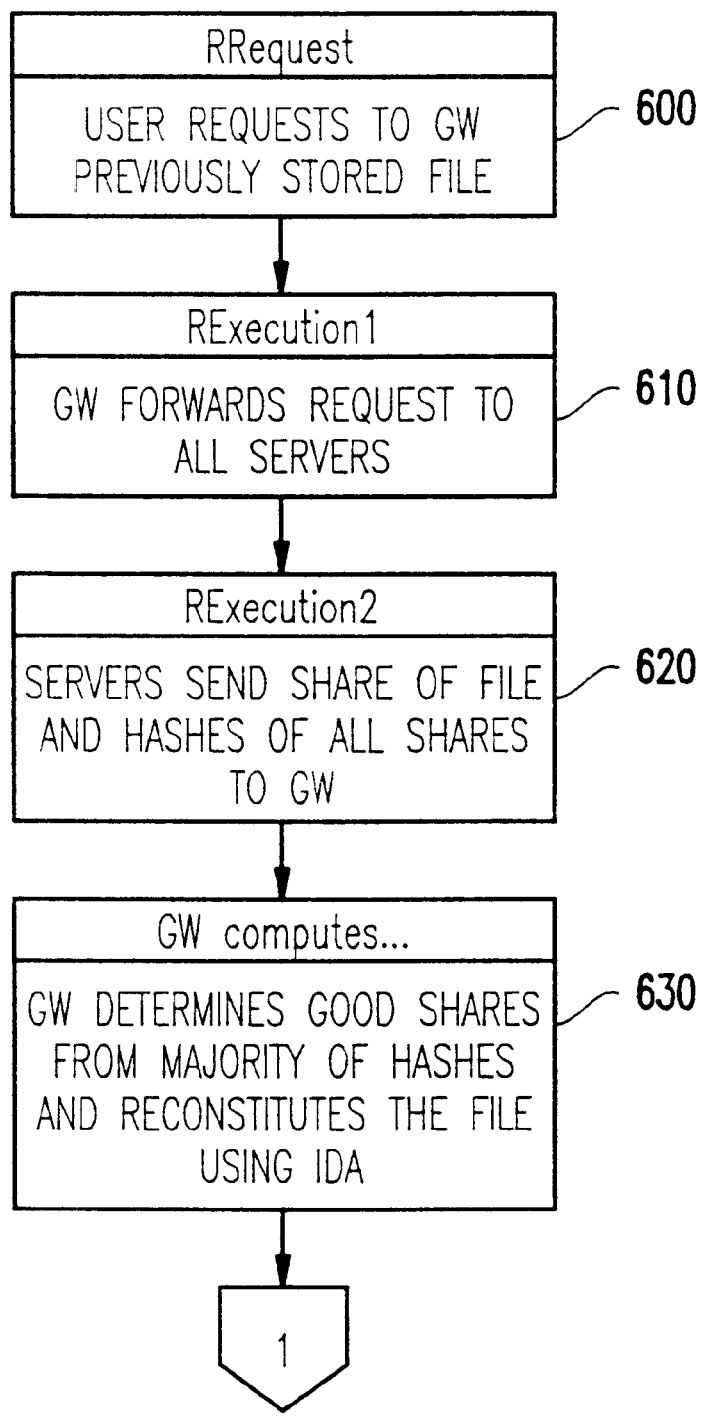
FIGS. 5A and 5B, taken together, are a flow diagram of the retrieval protocol according to the invention.
Figure 5B:
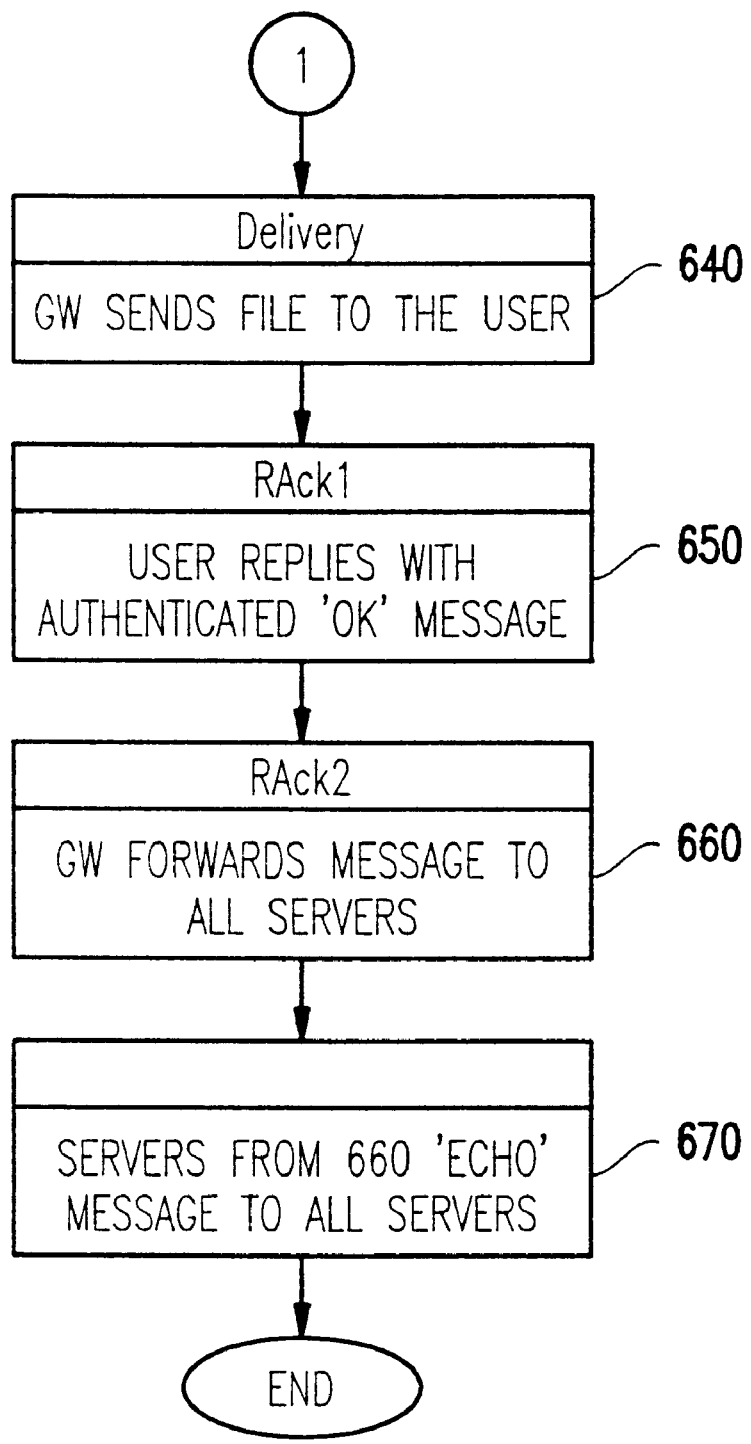

With reference now to FIGS. 5A and 5B, in Retrieval Request 600, the user contacts the GW to get the file back. He or she sends information identifying the deposit and signs the request under his or her authentication key, which convinces the servers of the authenticity of the request. In fact, more is needed than shown, e.g., a transaction ID, in order to prevent so-called "re-play" attacks, but we ignore this problem for the purpose of this discussion. In execution block 610, GW forwards the user's request to all servers. Every server $V_j$ receiving the request sends to GW its share $F_j$ of the file, together with file hashes of an the shares $\mathcal{H}(F_i)$, $1 \leq i \leq n$ in block 620. GW establishes what hashes are valid by computing majority, and discards those shares of the file whose hash does not evaluate to the computed one. Finally, the GW reconstructs the file using the remaining shares using IDA in block 630. Specifically, GW computes the following:

$\forall j$, $\mathcal{H}(F_j)$=majority of received $\mathcal{H}(F_j)$;
G: set of good indices; G=0;
$\forall j$, if $F_j$ evaluates to $\mathcal{H}(F_j)$ then $G=Gu\emptyset\{j\}$;
$F=\Sigma_{i \in G} F_i \cdot T_i^{-1}$ (reconstruct IDA).

In delivery block 640 (FIG. 5B), GW sends the file to the user. Upon receiving the file F, the user computes $\mathcal{H}(F)$ and verifies that it matches the hash that he or she stored during. If so, he or she sends a conformity message to the GW in block 650, and GW forwards the 'OK' message to all servers in block 660. Servers receiving the message from GW echo it to all servers in block 670.

Lemma 2 The Retrieval protocol satisfies the Retrieval Availability and Retrieval Correctness conditions.

Proof: Retrieval Availability. If GW does not respond to the user with the requested file, then the user will turn to another server in order to retrieve the file. As, by assumption, only a fraction of the servers can malfunction, and the design of the servers is uniform, it is guaranteed that the user will eventually contact a correct GW. Once this happens, all the correct servers get the user's request. As we assume that the user has in fact previously deposited the file and received a receipt, we are guaranteed that each correct server has saved the file (Lemma 1). This in turn enables each correct server to send GW its piece of the file and the hashes of all shares. Thus, GW will be able to compute the correct majority on the hashes and properly reconstruct the file.

Retrieval Correctness. If an improper request for Retrieval is received by the correct servers, they will not send their shares to GW. GW needs at least t+1 shares of the file in order to reconstruct it. As there are at most t faulty servers, GW will be short by at least one piece.

Lemmas 1 and 2, together with the arguments of the Dispersal subsection allow us to corroborate our claims of an integrity SSRI system with an asymptotically optimal blow-up. We now turn to the added requirement of confidentiality of the information.

Integrity and Confidentiality

We extend our protocols to enable the user to store the files while maintaining their contents private. The requirements for the confidentiality function consist of the Validity and Consistency conditions of the integrity, while adding to it a privacy condition. Any coalition of up to t servers (even those including GW) cannot learn anything about the contents of the file.

The privacy requirement poses the question of key management, that is, the safe deposit of the keys used to encrypt the file. The simplest solution requires each user U to have a public key for encryption, say $PK_U$, and the corresponding private key $SK_U$. This requires the user U to maintain $SK_U$ in a safe manner, just as he or she is maintaining the authentication private key $SK_{U,3}$. To deposit a file F with confidentiality, the user would generate a key (say a DES key) FK, encrypt the file F with FK, encrypt the key FK with the public key $PK_U$, and deposit both the encrypted file and the encrypted key $E_U(FK)$. The retrieval procedure is just the reverse.

However, it may be impractical or insecure to require that the user maintain the key $SK_U$. In the case of a smartcard implementation, the smartcard which maintains such keys securely may be limited in memory. In a software only solution, it would be ill-advised to keep $SK_U$ at the user's workstation, as if this key is compromised, then the secrecy of all the data will be lost. On the other hand, just maintaining the authentication key presents less of a problem, as authenticity can be regained through a combination of on-line and out-of-band steps. Also, the user application (e.g., a browser) may only provide an authentication key.

In the following, we show how $SK_U$ can be kept shared among the servers. This improves the security of $SK_U$ and it also provides a key recovery function for emergency situations. The file DES key FK will be retrieved by the user (or transferred to another user) without even the gateway server GW getting any knowledge about FK. To this end we use "blinding" in a novel way. We add confidentiality on top of the integrity-only solution described above. For this we require in our design that the user's private key $SK_U$ be kept shared among the servers, as described in more detail below.

Now we assume that in the Deposit protocol the file F is really the encrypted file $e_{FK}(F)$, under the key FK, and we append the encryption of the key $E_U(FK)$, under the user's encryption key. In the Dispersal protocol, however, it might be more time efficient to keep the encrypted key as it is at each server $V_i$. Thus, one consequence of the above is that at deposit time GW does not gain any information about F or FK.

At retrieval time, the GW requests each server to send it not only the portions of the encrypted file (and hashes), but also the partial decryptions of $E_U(FK)$ using a threshold decryption protocol. However, this would allow the gateway to reconstruct the complete decryption of $E_U(FK)$, i.e., the file key FK. In our protocol we use a "blinding" technique in order to prevent this. Namely, only the authorized user will be able to reconstruct FK.

Figure 6:
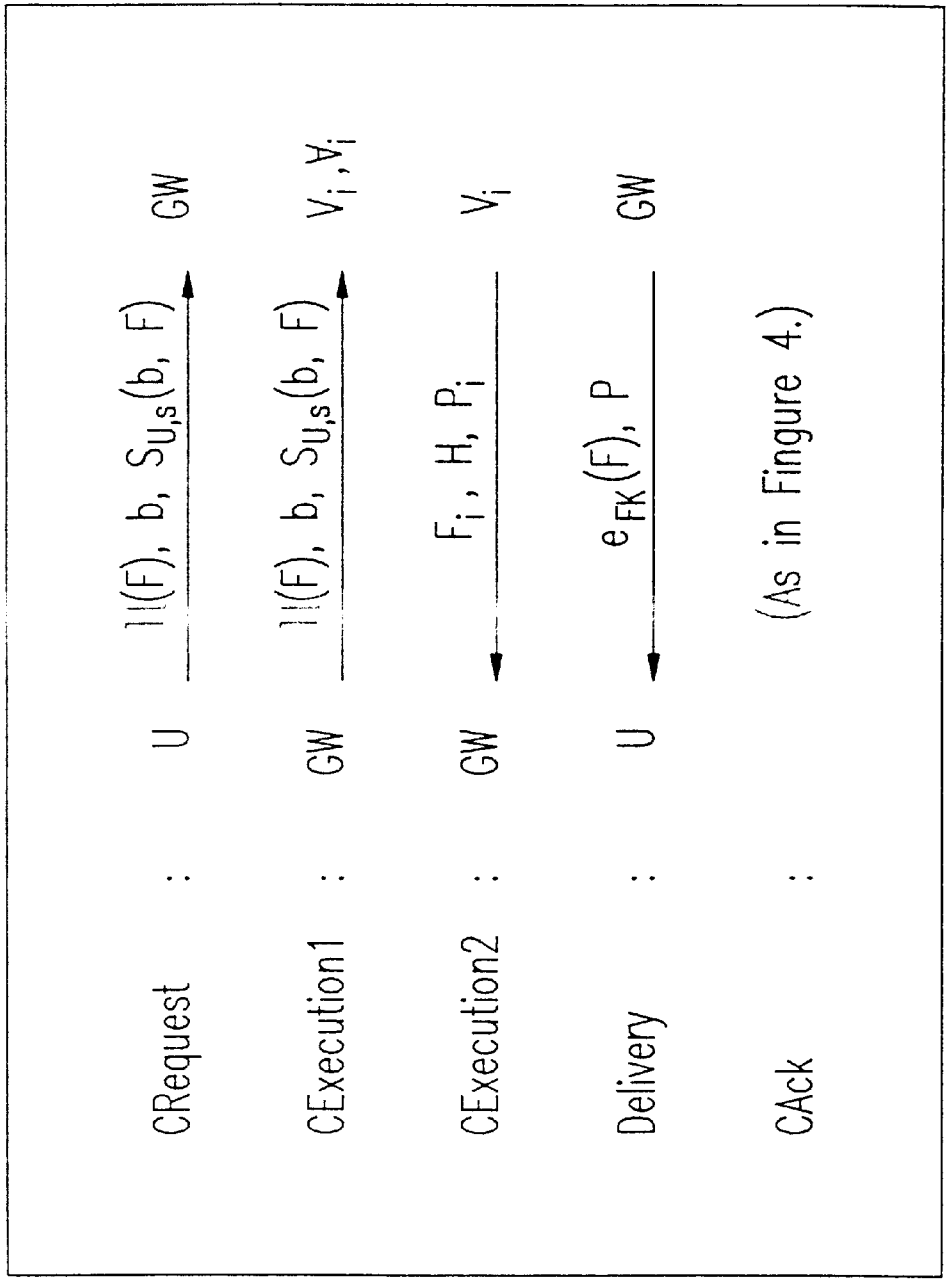
FIG. 6 is a protocol flow diagram illustrating the retrieval protocol with confidentiality according to the invention.

The fields for Retrieval with Confidentiality protocol are listed in Table 6 and the protocol flow diagram is shown in FIG. 6.

TABLE 6

| | Fields |
|---|---|
| r | Blinding factor: random number chosen by user U |
| b | $E_U(r)$ |
| $F_i$ | Portion of the file dispersed at server $V_i$ |
| ℋ | Hashes of all $F_i$s stored at each server, i.e., $\mathcal{H}(F_i)$, $1 \leq i \leq n$ |
| $d_i$ | Server $V_i$'s share of the decryption exponent, i.e., $SK_U$ |
| $P_i$ | Partial decryption from $V_i$ of $E_U(FK \cdot r)$ |
| P | $P = (FK \cdot r)$ |

Figure 7A:
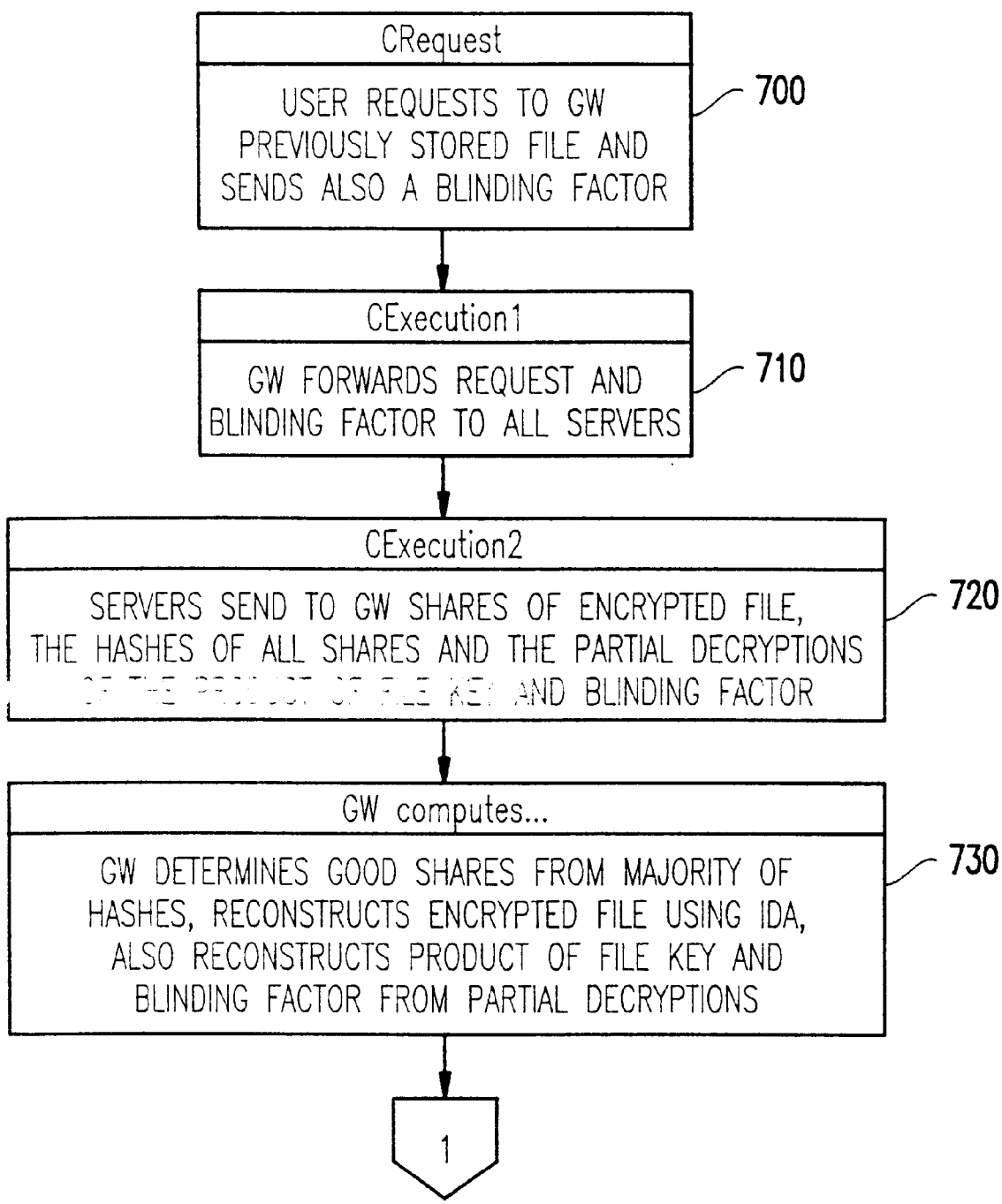
FIGS. 7A and 7B, taken together, are a flow diagram of the retrieval protocol with confidentiality according to the invention.
Figure 7B:
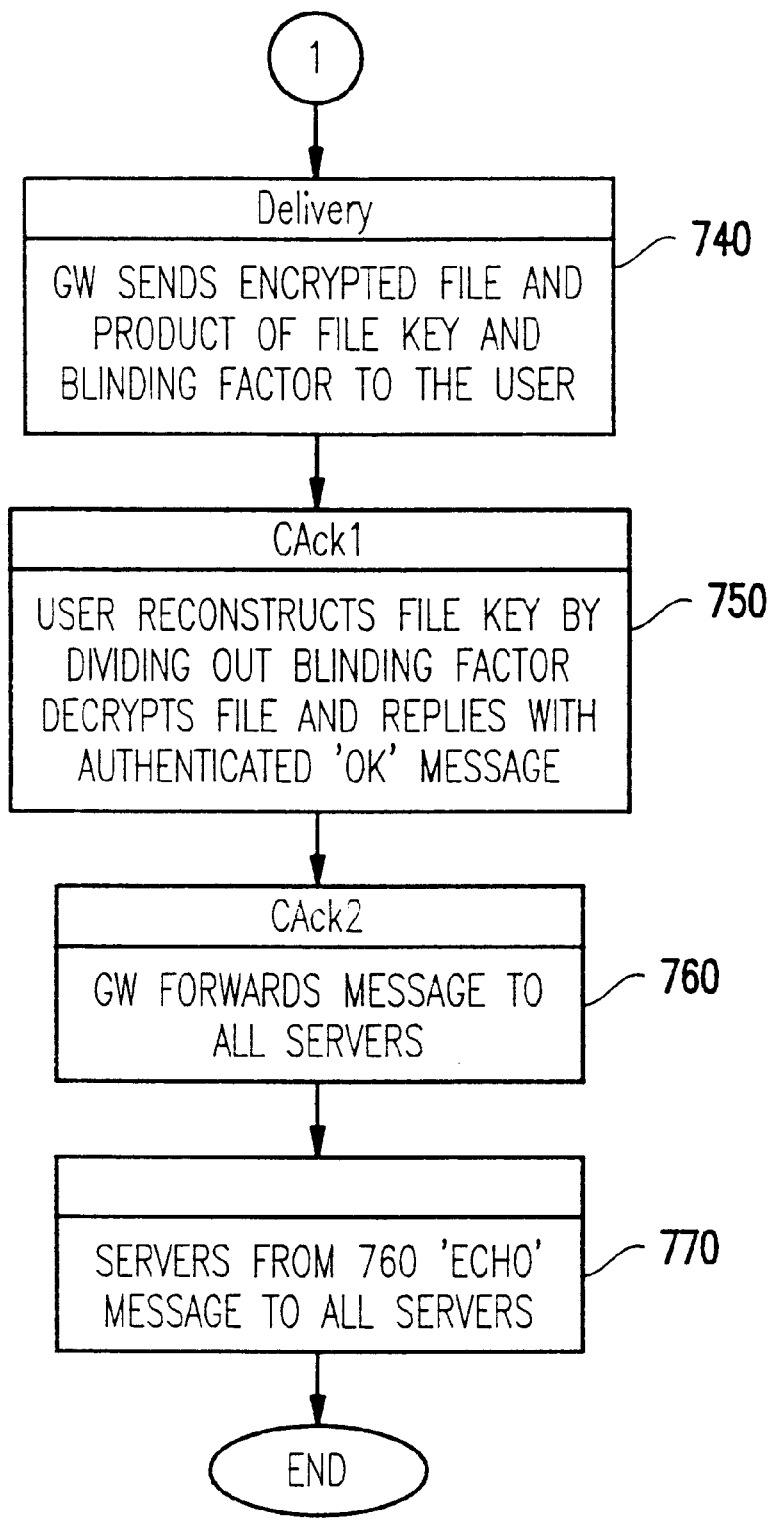

The flow diagram of the Retrieval protocol with confidentiality is shown in FIGS. 7A and 7B, to which reference is now made. The process begins in block 700 with the user U generating a retrieval request to a GW server for a previously stored file. The user also generates a random integer r. The user then saves r securely, though temporarily. The number r is intended to act as a blinding factor. The user then computes $b=E_U(r)$ (if RSA is used, then $b=r^3$ mod N.) The user then signs b and the name of the file he or she is requesting under his or her signing key and sends it to the GW. In CExecution1 block 710, the GW forwards this request to each of the servers $V_i$. The servers check in CExecution2 block 720 that the user signing this request has permission to access this file. If so, server $V_i$ generates $P_i$, a partial decryption of $E_U(FK) \cdot b = E_U(FK \cdot r)$ (assuming some homomorphic property of E, as in the case of RSA). If we are using a threshold RSA cryptosystem, then simply $P_i = E_U(FK) \cdot b)^{d_i}$ mod N, where $d_i$ is the share of $SK_U$ held by server $V_i$. Each server $V_i$ then sends $F_i$, the hashes $\mathcal{H}(F_j)$, $1 \leq j \leq n$, and $P_i$ to the GW. In block 730, the GW determines good shares from a majority of hashes, reconstructs the encrypted file using IDA, and also reconstructs the product of the file key and blinding factor from partial decryptions. As in protocol Retrieval before, the GW computes $e_{FK}(F)$ using the hashes and the $F_i$s received (not shown). It also computes the value $P=FK \cdot r$ from the partial decryptions $P_i$.

In block 740 in FIG. 7B, the GW now sends the encrypted file and the blinded key $P=(FK \cdot r)$ to user U. The user obtains the file key FK by factoring out r, and acknowledges receipt of the file in CAck1 block 750. GW then forwards an acknowledgment message to all servers in CAck2 block 760. Finally, the servers "echo" the acknowledgment message to all servers in block 770.

Lemma 3 Protocol Retrieval is correct, i.e., it satisfies the Retrieval Validity, Consistency and Privacy conditions.

Proof: Validity and Consistency are an immediate consequence of the integrity. only protocol. The Privacy condition can be argued as follows. Note that at no time the full key $SK_U$ is reconstructed. Also, we assume that the threshold decryption protocol used by the servers is secure, so it reveals no information to coalitions of size smaller than t, other than the plaintext being decrypted, in this case $P=FK \cdot r$. GW is the only party who gets to see $P=FK \cdot r$, but this is a randomly distributed value which gives no information about FK. The same measures that are used in the integrity-only solution against possible denial of service caused by a faulty GW are applied in this case too.

Proactive SSRI

The protocols described in the previous sections withstand the presence of an adversary that can read the memory and correct the behavior of at most t servers during the whole lifetime of the system.

If such lifetime is long, then the assumption that only t servers can be broken into may become unreasonable or too optimistic. Proactive Security, described by R. Canetti and A. Herzberg in "Maintaining security in the presence of transient faults", *Advances in Cryptology-CRYPTO '94*, Lecture Notes in Computer Science (839), pp. 425–438, Springer-Verlag, 1994, is an area of research that deals with secure distributed systems in the presence of an adversary that may corrupt all the serves during the whole lifetime of the system, although only t at a time (i.e., the assumption is that during a pre-specified interval of time, say a day, the adversary may break into at most t servers.

A basic technique of Proactive Security is to introduce refreshment phases in the system. During a refreshment phase, a server that has been broken into, but is not anymore under the control of the adversary, can be restored to its initial state. In particular, all the data destroyed or modified by the adversary is restored with the help of the other servers. Also, all secret information (e.g., cryptographic keys) contained in all the servers is somehow randomized so that the information leaked to the adversary in the previous time intervals will be useless in the future. Refreshment phases are invoked periodically regardless of the fact that break-ins have been detected or not.

The "poactivization" of our distributed storage system poses several interesting questions. At refreshing time, we need to restore the memory of potentially compromised servers. This can indeed be done by the assumption that only a minority of the servers might have been broken into during the previous interval. However, such a restoring operation can be potentially very expensive. Indeed, in order to restore the shares of a server, we need to recompute all the files and disperse them again. This means that at refreshing time, the whole memory of the system has to circulate around in order to restore eventual break-ins. This can potentially be an enormous task and should be performed only if strictly necessary. For example, if in the previous interval the adversary did not produce any damage (or corrupted only a small fraction of the memory of the system), the above task would be too expensive.

What we need is a form of "adaptive" proactiveness in which the system performs the expensive restoring only when it is really necessary, while routine refreshment phases are cheaper to perform. We describe our solutions, first for the integrity-only case and then for the integrity plus confidentiality case.

Integrity Only. Recall that each file F being deposited is first dispersed using our variation of SIDA. This means that each server $V_i$, $1 \leq i \leq n$, will have an IDA-share of F, $F_i$, plus all the "fingerprints" of all the shares $\mathcal{H}(F_1)$, ..., $\mathcal{H}(F_n)$. By assumption, during any given time interval, only a minority of the servers can be corrupted. At the beginning of the refreshing phase, each server broadcasts to the other servers the fingerprints. Server $V_i$ takes a majority vote among the received fingerprints to identify the correct ones. It then checks if its own fingerprints are correct. If they are corrupted, it replaces them with the correct ones. It then checks its own IDA-share Fi against the correct fingerprint $\mathcal{H}(F_i)$. If the share has been modified, it broadcasts a message asking the other servers to reconstruct Fi for it. It then takes a majority from among the received messages to identify the correct $F_i$.

Notice that if the adversary was not present (or did no damage) in the previous time interval, fingerprints of the stored files must circulate during the refreshment phase. This is clearly a negligible communication cost compared to the whole storage of the system. If the adversary did some damage, then the communication complexity of the refreshing phase is still only proportional to the amount of information the adversary corrupted and not to the whole memory of the system.

Integrity and Confidentiality. In this case, the refreshment phase will consist first of all of the integrity-only refreshment phase, carried out on the encrypted files. However, in this scenario we need to worry about an adversary who, besides corrupting the files, might also read the shares of the users' secret keys kept at a server. Once the adversary reads more than t+1 of such shares, the adversary will be able to decrypt the users' files. But the shares of the secret keys can be proactivized using techniques used in threshold cryptography. The refreshment phases for proactive threshold cryptography schemes have a communication complexity proportional to the size of the keys. So once again in the optimistic case (i.e., when the adversary does not corrupt the memory of the system) the work done in a refreshment phase is very small compared to the potential amount of memory of the system.

Specific Implementation

In this section we describe a specific implementation of the invention. We designed a fully secure system which provides protection against these and other kinds of faults without overburdening the system with memory and computational requirements. The main feature of our storage system is its distributed nature. The implemented storage system is generally as illustrated in FIG. 1.

The storage system is composed by five servers, which we denote as $V_1, \ldots, V_5$. These are high-end RS/6000 computer systems running the AIX operating system. These computer systems have large storage capabilities and high-performance features. We assume that at most two of these servers can be corrupted (i.e., malfunctioning in any way) at any time.

The servers are connected by a secure point-to-point network; that is, messages exchanged by two servers cannot be read or modified by anybody. Such secure channels can be implemented either physically or via cryptographic techniques.

The storage system (which we denote in its entirety with V) is accessible to the users. A user U runs some software on a low-end machine (like a personal computer (PC)) using a World Wide Web (WWW) interface. Communication between U and V is via the Internet. We require such communication also to be secure. This can be achieved via protocols for secure transmission of information over the Internet, such as SSL.

For efficiency's sake, in our protocols the users will interact with a single, not necessarily the same, distinguished server, called the gateway (GW). However, this implementation is uniform, in the sense of all servers are able to perform the same distribution and recovery functions. This means that the software run by the user will approach a randomly chosen server as the GW. If the protocol fails, then the software will approach another randomly chosen server $V_j$ among the remaining ones. Since a failure of the protocol from the user's end means that GW is corrupted, then we know that U tries at most three servers as the GW.

The choice of server as the gateway is randomized (instead of deterministic) to avoid overloading a single server. Other strategies can be used for this goal, like a different sequence of servers to try out depending on the geographic location of the user.

This implementation uses the following cryptographic functions. We stress that while we are specifying algorithms for this implementation, the scheme works in general under any secure instatiation. In particular one could use discrete log based algorithms instead of RSA. Also, key lengths appear appropriate today, but should be updated according to algorithmic advances or computing power increases.

We need a hash function $\mathcal{H}$ which is collision-resistant; i.e., it is infeasible to find two strings $x \neq y$ such that $\mathcal{H}(x) = \mathcal{H}(y)$. In this implementation, we istantiate this to the function SHA-1 proposed by the National Institute of Standards and Technology as the standard for collision-resistant hash functions. SHA-1 takes an argument of arbitrary length and returns a 160-bit value as the result.

Symmetric encryption is an algorithm e which takes as input a message M and a key K and returns a ciphertext $e_K(M)$. It is infeasible to compute M from $e_K(M)$ without knowledge of K. This specific implementation uses DES-CBC. In this case K is 56 bits long.

An algorithm message authentication code (MAC) takes as input a message M and a key K and returns a tag $mac_K(M)$. It is infeasible to compute a valid pair (M, $mac_K(M)$) without knowledge of K. This specific implementation uses HMAC as described, for example, by M. Bellare, R.f Canetti and H. Krawczyk in "Keying Hash Functions for Message Authentication", *Proc. Advances in Cryptoloty-CRYPTO '96*, LNCS vol. 1109, Springer-Verlag, pp. 1–15, 1996. We use HMAC also as construction for pseudorandom function families.

Public-key encryption is an algorithm E which takes as input message M and a public key PK and returns $E_{PK}(M)$. It is infeasible to compute back M without knowledge of the secret key SK matching PK. We use it only to encrypt symmetric keys; i.e., keys K for the algorithm e. We instatiate this primitive to 1024-bit RSA-OAE, which is a variant of RSA which also provides "plaintext-aware" encryption, which detects tampering on the ciphertext.

The signature algorithm used in the protocols is the 1024-bit RSA-SHA-1. That is, the signer has an RSA public key N of 1024 bits. The secret key is $d = 3^{-1} \mod \phi(N)$. To sign a message M, the signer first computes m'=SHA-1 (M) and then pads it with random bits to a string of 1024 bits, m=r·m'. He or she then computes $\sigma = m^d \mod N$ as the signature on M. The 49 pair M,σ is verified by the receiver by checking that $lsb_{160}(\sigma^3) = SHA-1(M) \mod N$.

The keys and cryptographic primitives used in the protocols are summarized in Tables 7 and 8, respectively.

TABLE 7

| | Fields |
|---|---|
| $PK_U, SK_U$ | Public and Secret keys for a 1024-bit RSA-OAF of user U |
| $CERT_U$ | Public key certificate of user U, issued by the servers V |
| $PK_{U,s}, SK_{U,s}$ | Public and secret "signing" keys of user U for 1024-bit RSA-SHA-1 scheme |
| $sk_{V_i}$ | Server $V_i$'s share of secret key $SK_V$ |

TABLE 8

| | Fields |
|---|---|
| $\mathcal{H}(\cdot)$ | SHA-1: a strong collision-resistant one-way has function |
| $E_U$ | 1024-bit RSA-OAE public key encryption using $PK_U$ |
| $S_U(\cdot)$ | RSA-SHA-1 digital signature with respect to $SK_U$ |
| $S_{V_1, \ldots, V_5}(\cdot)$ | Distributed RSA-SHA-1 digital signature with respect to keys $sk_{V_1}, \ldots, sk_{V_5}$ |
| $\sigma_{V_i}(\cdot)$ | Partial digital signature with respect to $sk_{V_i}$ |
| $e_K$ | DES-CBC: symmetric key-based encryption algorithm, taking key K and a plaintext, and producing a ciphertext |
| $mac_K$ | HMAC: message authentication code, taking key K and a plaintext, and returning a short tag |
| $f_K$ | HMAC: a conjectured pseudorandom function with index K |
| $RS(\cdot)$ | Reed-Solomon code |

In order to achieve tolerance of faults among the servers, we need to share their decryption and signature power among them. In order to do that we need to construct the system's signature scheme in a way that only when three out of five of them collaborate, a valid signature is produced. Also, the system should be able to tolerate two faulty players who want to prevent the whole system from issuing a signature, and similarly for a public key decryption.

In this specific implementation, we use RSA-based a algorithms for both signatures and public key encryption. In order to distribute this power among the servers, we use the protocols for robust threshold RSA. Using that protocol, the secret key SK of the system is shared among the servers. Each server receives a partial key $sk_{V_i}$.

For the case of signing on input M, each server creates a partial signature $\sigma_{V_i}(M)$ which also includes a proof of its correctness. The GW will discard the invalid partial signatures (at most two of them) using such proof. Then from the remaining three valid partial signature will reconstruct the real signature on M.

The process is similar for the case of public key decryption. On input of a ciphertext C, each server will create a partial plaintext $P_i$ which also includes a proof of its correctness. The Gw discards the invalid partial plaintexts (at most two of them) using such proof. Then, from the remaining three valid partial plaintexts, the GW reconstructs the full plaintext P.

We use blinding to prevent the GW from learning the content of a file deposited by the user in encrypted form when confidentiality is required.

When the user deposits the file F (see deposit protocol of FIG. 2) when confidentiality is required, he or she performs the following steps. First, a 56-bit file key FK for the encryption algorithm e is generated. Then he or she deposits $e_{FK}(F), E_V(FK)$. The user saves only the receipt and not the file key FK since this is sensitive information.

When the file is retrieved, the GW should provide the user with $e_{FK}(F)$ and FK. But if done in the clear, this will allow the GW to learn the content of F. So the retrieval protocol works as follows.

U sends $E_V(r)$. Recall that this is the Bellare-Rogaway RSA-based OAE scheme. That means that first there is a randomized preprocessing that maps r to r' and then r' is encrypted with traditional RSA; i.e., the value $c = (r')^3 \mod N$ is produced. The preprocessing is reversible; i.e., from r' it is possible to compute r. FK is also encrypted in the same fashion.

The servers do only the RSA part of the decryption for the value $E_V(FK) \cdot E_V(r)^d$; i.e., the modular exponentiation to the secret exponent. They do this in the distributed fashion described above. So the value $(E_V(FK) \cdot E_V(r))^d$ mod N is computed. But given the homomorphic property of traditional RSA this is just FK'·r'.

U has kept r' securely so he or she can recover FK' and from that FK, The GW knows nothing about FK.

The five servers are initialized in a trusted environment. Each of them is given a name (i.e., $V_1$ to $V_5$), an IP address and a share of the signing and decryption key for the whole system. The key generation is done by a trusted party who then self-destroys after generating such keys and sharing them among the servers. In case one uses a discrete-log based cryptosystem, it is possible to have the five servers run a key generation protocol which eliminates the need for such trusted party. However, the other parts of the initialization needs to be conducted in a trusted environment.

While the invention has been described in terms of a single preferred embodiment and by of a specific implementation example, those skilled in the art will recognize that the invention can be practiced with modification within the spirit and scope of the appended claims.

Having thus described our invention, what we claim as new and desire to secure by Letters Patent is as follows:

1. A computer implemented method for the secure distributed storage of information from a user into a storage system including a plurality of servers comprising:

designating one server of said plurality of servers as a gateway server for the user;

depositing a file from said user to said storage system via the gateway server;

distributing by the gateway server said file among said plurality of servers within said storage system;

receiving by the gateway server an acknowledgment from each of the servers in the storage system receiving parts of the dispersed file; and generating by the gateway server an authenticated proof that said storage system received and correctly stored the file, said proof being provided even when at least one of said servers malfunctions due to a failure.

2. The computer implemented method as recited in claim 1, wherein there exists a first number n of said servers, and wherein there exists a second number t of said servers that have malfunctioned, where t is less than n, and wherein each said servers receives a share of the file F, each said share having an element size of at least $$\frac{|F|}{n-t}$$

plus a quantity of q, in which q depends upon n and a security parameter s.

3. The computer implemented method recited in claim 2, wherein said security parameter s is equal to the logarithm base two of an acceptable probability of failure of the system.

4. The computer implemented method as recited in claim 3, wherein a proactive security protocol is implemented in which all servers may be corrupted during a lifetime of the storage system but only t servers are corrupted during any given time period.

5. The computer implemented method as recited in claim 4, wherein the proactive security protocol includes the steps of:

broadcasting by each server hashes of file shares;

taking a majority vote by each server among the received hashes of file shares to identify correct hashes;

checking by each server to determine if hashes of file shares stored by the server are correct;

if hashes of files shares stored by a server are corrupted, replacing by the server corrupted hashes with correct hashes;

then checking by each server its share of the stored file against a correct hash of the file;

if a server's share of the stored file has been modified, broadcasting by the server a message asking other servers to reconstruct the file share; and then taking a majority vote among received response from other servers to identify a correct file share.

6. The computer implemented method as recited in claim 1, wherein said step of distributing is transparent to the user.

7. The computer implemented method as recited in claim 1, wherein each user of the storage system may interact with a different server designated as the gateway for the user for a given transaction whereby a single gateway does not become a single point of failure for the storage system.

8. The computer implemented method as recited in claim 1, wherein said storage of information takes place in a successful manner despite the presence of at least a malfunctioning server due to a malicious fault.

9. The computer implemented method as recited in claim 1, wherein said authenticated proof is obtained by generating a receipt for a deposit of said file through an application of distributed digital signatures such that said receipt is only issued when said file has been successfully stored.

10. The computer implemented method as recited in claim 9, wherein said step of generating a receipt is performed even when one or more of the servers malfunctions due to a failure.

11. A computer implemented method for the secure distributed storage and retrieval of information of a user in a storage system including a plurality of servers comprising:

for a given transaction, designating one server of said plurality of servers as a gateway server for the user;

depositing a file from the user to the storage system via the gateway server;

distributing by the gateway server by dispersing the file among a plurality of servers within said storage system;

receiving by the gateway server an acknowledgment from each of the servers in the storage system receiving parts of the dispersed file;

generating by the gateway server an authenticated proof that said storage system received and correctly stored the file, said proof being provided even when at least one of said servers malfunctions due to a failure;

responding by the gateway server to a user request for a previously stored file by forwarding the request to all servers in the storage system;

checking by each server to determine if the user making the request has permission to access the requested file;

if the user making the request has permission to access the requested file, sending by each server in the storage system their respective shares of the stored file and hashes of all shares to the gateway server;

determining by the gateway server good shares from a majority of hashes received from other servers and reconstituting the file using an information dispersal algorithm; and sending the reconstituted file to the user.

12. The computer implemented method as recited in claim 11, wherein there exists a first number n of said servers, and wherein there exists a second number t of said servers that may have malfunctioned, where t is less than n, and wherein each said servers receives a share of the file F, each said share having an element size of at least $$\frac{|F|}{n-t}$$

plus a quantity of q, in which q depends upon n and a security parameter s.

13. The computer implemented method recited in claim 12, wherein said security parameter s is equal to the logarithm base two of an acceptable probability of failure of the system.

14. The computer implemented method as recited in claim 13, wherein an proactive security protocol is implemented in which all servers may be corrupted during a lifetime of the storage system but only t servers are corrupted during any given time period.

15. The computer implemented method as recited in claim 14, wherein the proactive security protocol includes the steps of:
 broadcasting by each server hashes of file shares;
 taking a majority vote by each server among the receive hashes of file shares to identify correct hashes;
 checking by each server to determine if hashes of file shares stored by the server are correct;
 if hashes of files shares stored by a server are corrupted, replacing by the server corrupted hashes with correct hashes;
 then checking by each server its share of the stored file against a correct hash of the file;
 if a server's share of the stored file has been modified, broadcasting by the server a message asking other servers to reconstruct the file share; and
 then taking a majority vote among received response from other servers to identify a correct file share.

16. The computer implemented method as recited in claim 13, wherein said step of distributing is transparent to the user.

17. The computer implemented method as recited in claim 13, wherein each user of the storage system may interact with a different server designated as the gateway for the user for a given transaction whereby a single gateway does not become a single point failure for the storage system.

18. The computer implemented method as recited in claim 17, wherein said storage of information takes place in a successful manner despite the presence of a malfunctioning server due to a malicious fault.

19. The computer implemented method as recited in claim 17, wherein said authenticated proof is obtained by generating a receipt for a deposit of said file through an application of distributed digital signatures such that said receipt is only issued when said file has been successfully stored.

20. The computer implemented method as recited in claim 19, wherein said step of generating a receipt is performed even when one or more of the servers malfunctions due to a failure.

21. The computer implemented method for the secure distributed storage and retrieval of information recited in claim 13 wherein the step of designating one server of said plurality of servers as a gateway server for the user includes designating any one of said plurality of servers as the gateway for purposes of file storage and any one of said plurality of servers as the gateway for purposes of file retrieval, the designated gateway servers for file storage and retrieval not necessarily being the same server from transaction to transaction.

22. A storage system for the secure distributed storage and retrieval of information from a user comprising a plurality of servers connected in a network, one of said servers being designated as a gateway server for the user for a given transaction, the gateway server receiving a file from the user to be stored in the storage system, the gateway server distributing the file by dispersing among a plurality of servers within said storage system, the gateway server receiving an acknowledgment from each of the servers in the storage system receiving parts of the dispersed file, and the gateway server generating an authenticated proof that the storage system received and correctly stored the file, said proof being provided even when at least one of said servers malfunctions due to a failure.

23. The storage system recited in claim 22 wherein the gateway server responds to a user request for a previously stored file by forwarding the request to all servers in the storage system, each server in the storage system checking to determine if the user making the request has permission to access the requested file and if the user making the request has permission to access the requested file, each server sending their respective shares of the stored file and hashes of all shares to the gateway server, the gateway server determining good shares from a majority of hashes received from other servers and reconstituting the file using an information dispersal algorithm and sending the reconstituted file to the user.

24. The storage system recited in claim 23 wherein the network is the Internet.

25. The storage system recited in claim 23 wherein any one of said plurality of servers may be designated as the gateway for purposes of file storage and any one of said plurality of servers may be designated as the gateway for purposes of file retrieval, the designated gateway servers for file storage and retrieval not necessarily being the same server from transaction to transaction.

26. A storage system comprising:
 a plurality of servers connected in a communication network having a protocol which enables information files to be stored distributively throughout the network of servers and information files to be retrieved by any single server in the network using a retrieval protocol, one of said servers being designated as a gateway server for a user of the storage system; and a computer capable of accessing the gateway server by a communication link established with said network, said computer depositing a file from the user to said storage system via the gateway server, the gateway server distributing said file among said plurality of servers within said storage system, the gateway server receiving an acknowledgment from each of the servers in the storage system receiving parts of the dispersed file, and the gateway server generating an authenticated proof that said storage system received and correctly stored the file, said proof being provided even when at least one of said servers malfunctions due to a failure and retrieve said distributively stored information or input information to be distributively stored on said network of servers.

27. The storage system recited in claim 26 wherein the network is the Internet.

28. The storage system recited in claim 26 wherein any one of said plurality of servers may be designated as the gateway for purposes of file storage.

29. A storage and retrieval system comprising:
 a plurality of servers connected in a communication network having a protocol which enables information files to be stored distributively throughout the network of servers and information files to be retrieved by any single server in the network using a retrieval protocol, one of said servers being designated as a gateway server for a user of the storage and retrieval system for a given transaction; and a computer capable of accessing the gateway server by a communication link established with said network, said computer depositing a file from the user to the storage and retrieval system via the designated gateway server, the designated gateway server distributing the file among a plurality of servers within said storage and retrieval system, the gateway server receiving an acknowledgment from each of the servers in the storage system receiving parts of the dispersed file, the gateway server generating an authenticated proof that said storage system received and correctly stored the file, said proof being provided even when at least one of said servers malfunctions due to a failure, the gateway server responding to a user request for a previously stored file by forwarding the request to all servers in the storage system, each server checking to determine if the user making the request has permission to access the requested file, each server sending their respective shares of the stored file and hashes of all shares to the gateway server if the user making the request has permission to access the requested file, the gateway server determining good shares from a majority of hashes received from other servers and reconstituting the file using an information dispersal algorithm and sending the reconstituted file to said computer.

30. The storage and retrieval system recited in claim 29 wherein the network is the Internet.

31. The storage and retrieval system recited in claim 29 wherein any one of said plurality of servers may be designated as the gateway for purposes of file storage and any one of said plurality of servers may be designated as the gateway for purposes of file retrieval, the designated gateway servers for file storage and retrieval not necessarily being the same server from transaction to transaction.

\* \* \* \* \*